United States Patent
Cao et al.

(10) Patent No.: US 12,547,125 B2
(45) Date of Patent: Feb. 10, 2026

(54) DUAL-POSITION LOOP CONTROL METHOD AND SYSTEM OF TURNTABLE BASED ON HARMONIC SPEED REDUCTION MECHANISM

(71) Applicant: Xi'an Institute of Optics and Precision Mechanics, Chinese Academy of Sciences, Shaanxi (CN)

(72) Inventors: Yu Cao, Shaanxi (CN); Haitao Wang, Shaanxi (CN); Xin Li, Shaanxi (CN); Junfeng Han, Shaanxi (CN); Shan Guo, Shaanxi (CN); Meilin Xie, Shaanxi (CN); Fan Wang, Shaanxi (CN); Lei Wang, Shaanxi (CN)

(73) Assignee: Xi'an Institute of Optics and Precision Mechanics, Chinese Academy of Sciences, Shaanxi (CN)

(*) Notice: Subject to any disclaimer, the term of this patent is extended or adjusted under 35 U.S.C. 154(b) by 458 days.

(21) Appl. No.: 18/301,500

(22) Filed: Apr. 17, 2023

(65) Prior Publication Data
US 2023/0333517 A1 Oct. 19, 2023

(30) Foreign Application Priority Data
Apr. 18, 2022 (CN) .......................... 202210406398.3

(51) Int. Cl.
H02P 21/30 (2016.01)
G05B 13/02 (2006.01)
G05D 3/20 (2006.01)
H02P 6/14 (2016.01)

(52) U.S. Cl.
CPC ............ *G05B 13/024* (2013.01); *G05D 3/20* (2013.01)

(58) Field of Classification Search
CPC ...... H02P 27/085; H02P 27/14; H02P 29/028; H02P 29/60; H02P 5/46; H02P 5/68; H02P 5/74; H02P 6/187; H02P 7/2913; H02P 8/04; H02P 8/10; H02P 8/22; H02P 17/00; H02P 21/00; H02P 21/0025; H02P 21/0089
See application file for complete search history.

(56) References Cited

U.S. PATENT DOCUMENTS

| | | | |
|---|---|---|---|
| 2012/0239198 A1* | 9/2012 | Orita | B25J 9/1633 700/260 |
| 2017/0007336 A1* | 1/2017 | Tsuboi | B25J 9/1674 |

* cited by examiner

*Primary Examiner* — Kawing Chan
*Assistant Examiner* — Charles S Laughlin
(74) *Attorney, Agent, or Firm* — NKL Law; Allen Xue

(57) ABSTRACT

A dual-position loop control method and system of a turntable are based on a harmonic speed reduction mechanism. The system and the method use feedbacks from two positions with the help of a first position sensor mounted on a shaft of a motor and a second position sensor mounted on an output end of a harmonic speed reducer respectively. The response is fast at the position of the shaft of the motor, and the second position sensor at the output end of the harmonic speed reducer can directly measure the position of a harmonic output end. Therefore, the influence of nonlinearity factors on the control system is reduced.

6 Claims, 7 Drawing Sheets

DUAL-POSITION LOOP CONTROL METHOD AND SYSTEM OF TURNTABLE BASED ON HARMONIC SPEED REDUCTION MECHANISM

TECHNICAL FIELD

The present disclosure belongs to a turntable control method and control system, and particularly relates to a dual-position loop control method and system of a turntable based on a harmonic speed reduction mechanism.

BACKGROUND

High-resolution imaging has become a development trend and is widely used in various fields. A tracking turntable serves as a piggybacking device for an imaging system, and its speed stationarity is the basis for high-resolution stable imaging. Particularly, in the aerospace field, there are higher requirements on peak power consumption, torque holding, speed stationarity and position tracking precision, and the degree of advancement and strength of functions of a spatial rotation mechanism are generally directly relevant to the performance of its control system.

A control system with a harmonic speed reduction mechanism is much more complex than the control of a purely rigid joint for several reasons: (1) the system is a time-varying, strongly non-linear, rigid-flexible coupled system because parameters in kinetic equations change with the displacement of the rotation mechanism as it moves; (2) the nonlinearity exhibited by the system theoretically belongs to infinite dimension, and the degree of freedom of the system is greater than the number of general control variables, so that ill-conditioned characteristics are exhibited; and (3) the system exhibits non-minimum phase characteristics due to compressional deformation of the soft wheels of the harmonic speed reduction mechanism, which can easily cause instability of non-collocated systems (a sensor and a driver at different positions). Therefore, studies on the control of the spatial rotation mechanism with the harmonic speed reduction mechanism are mainly directed to high-precision position control and stationarity at low speed.

In existing studies, the control system of the turntable based on the speed reduction mechanism can be divided into a semi-closed loop control system and a full-closed loop control system according to different mounting positions of feedback sensors. The manner that the feedback sensor is mounted on a shaft of a motor and indirectly measures the output position of a harmonic end is referred to as the semi-closed loop control system. Currently, the controller of the harmonic speed reduction mechanism is mostly designed based on the information of the feedback sensor at the motor position. The semi-closed loop control system has high speed stationarity, but is greatly affected by nonlinearity factors, so that the trajectory tracking capability of the system is reduced to increase the tracking error is increased, resulting in incapability of guaranteeing the output position precision. In addition, part of controllers of the turntable are designed based on the information of the feedback sensor at the harmonic output position, a manner that a position sensor is mounted on an output shaft of a harmonic speed reducer to directly measure the output displacement is referred to as the full-closed loop control system. In this manner, although the presence of nonlinearity factors in the harmonic drive does not affect its output position precision, it can be known by the Routh stability criterion that the value range of the proportional gain factor of the controller has certain limitations, which can easily lead to system instability and poor output speed stationarity. In addition, the two-dimensional turntable controller based on the harmonic speed reduction mechanism is not subjected to active disturbance rejection design for external nonlinearity disturbances, resulting in limited response speed and system stability, and reduced system control accuracy.

The Chinese patent application with the publication number CN104166372A discloses an anti-disturbance controller with dual-position loop feedback for a feeding system, which obtains a higher control bandwidth by utilizing the errors of input signals and feedback measurement signals and its differential design linear feedback rate on the basis of compensating the total disturbance in real time. However, in this patent application, an inner loop uses motor angle position signals as feedback signals, and an outer loop uses load position end feedback signals, without taking into account the differences caused by position disturbances in front of and behind a flexible joint.

SUMMARY

The present disclosure provides a dual-position loop control method and system of a turntable based on a harmonic speed reduction mechanism in order to solve the technical problems of a current control system of a turntable based on a speed reduction mechanism that a semi-closed loop control system has limited response speed and stability, the output position precision cannot be guaranteed, a full-closed loop control system is unstable, and the output speed stationarity is poor.

In order to achieve the above objective, the present disclosure is implemented employing the following technical solutions.

A dual-position loop control method of a turntable based on a harmonic speed reduction mechanism has the special features of including the following steps:

S1, collection of first position information and second position information:

collecting first position information output by a first position sensor mounted on a shaft of a motor, and second position information output by a second position sensor mounted on an output end of a harmonic speed reducer;

S2, extraction of an angular speed, an angle and current:

extracting a motor angular speed and a motor angle respectively from the first position information, extracting a load angle and a load angular speed respectively from the second position information; and meanwhile, acquiring motor current;

S3, closed loop control:

S3.1, performing difference comparison on the load angle and a load angle reference to obtain a load angular speed reference according to the comparison result;

S3.2, performing difference comparison on the load angular speed and a load angular speed reference to obtain a motor angle reference according to the comparison result;

S3.3, performing difference comparison on the motor angle and a motor angle reference to obtain a motor angular speed reference according to the comparison result;

S3.4, performing difference comparison on the motor angular speed and a motor angular speed reference to obtain a motor current reference according to the comparison result; and S3.5, performing difference comparison on the motor current and a motor current reference, and controlling input current of a motor according to the comparison result, thereby controlling the turntable to operate.

Further, in step S3.1, the load angle reference is specifically an nth input angle c[n] obtained by performing interpolation calculation on a target angle through the following equation:

$$c[n] = y[0] + \frac{(n-N[0]) \times (n-N[2])}{(N[1]-N[0]) \times (N[1]-N[2])} \times (y[1]-y[0]) + \frac{(n-N[0]) \times (n-N[1])}{(N[2]-N[0]) \times (N[2]-N[1])} \times (y[2]-y[0])$$

wherein, y[2] is a newly obtained target angle, y[0] is a target angle obtained from the previous two times of y[2], y[1] is a target angle obtained from the previous time of y[2], N[0] is the number of interpolations before y[0], and has a value being 0, N[1] is the number of interpolations between two points y[0] and y[1], N[2] is the number of interpolations between two points y[0] and y[2], wherein n=1, 2, . . . i, and i is the total number of input angles between y[1] and y[2] obtained after interpolation calculation.

Further, in step S3.1, the load angle reference is specifically obtained by the following steps:

S3.1.1, interpolation calculation of the target angle:

obtaining the nth input angle c[n] by performing interpolation calculation on the target angle through the following equation:

$$c[n] = y[0] + \frac{(n-N[0]) \times (n-N[2])}{(N[1]-N[0]) \times (N[1]-N[2])} \times (y[1]-y[0]) + \frac{(n-N[0]) \times (n-N[1])}{(N[2]-N[0]) \times (N[2]-N[1])} \times (y[2]-y[0])$$

wherein, y[2] is a newly obtained target angle, y[0] is a target angle obtained from the previous two times of y[2], y[1] is a target angle obtained from the previous time of y[2], N[0] is the number of interpolations before y[0], and has a value being 0, N[1] is the number of interpolations between two points y[0] and y[1], N[2] is the number of interpolations between two points y[0] and y[2], wherein n=1, 2, . . . i, and i is the total number of input angles between y[1] and y[2] obtained after interpolation calculation;

S3.1.2, performing five-point prediction calculation on the newly calculated 5 input angles to obtain a pre-extrapolation angle A[n], and taking the pre-extrapolation angle as the load angle reference:

$$A[n] = ((c[4]-c[1]) - (c[5]-c[1]) + \frac{(c[2]-c[1])}{16} + (2 \times ((c[5]-c[1]) - (c[2]-c[1])) + ((c[5]-c[1]) - (c[3]-c[1])))/4 + ((c[5]-c[1]) - (c[5]-c[1])) + c[1]$$

wherein c[5] is the latest input angle of the 5 input angles calculated latest, c[4] is an input angle of the previous time of c[5], c[3] is an input angle of the previous time of c[4], c[2] is an input angle of the previous time of c[3], c[1] is an input angle of the previous time of c[2].

The present disclosure further provides a dual-position loop control system of a turntable based on a harmonic speed reduction mechanism, which is used to implement the above dual-position loop control method of the turntable based on the harmonic speed reduction mechanism. The system has the special features of including a first difference comparator, a position controller, a second difference comparator, a speed controller, a third difference comparator, a motor position controller, a fourth difference comparator, a motor speed controller, and a fifth difference comparator, as well as a current controller for connecting a motor, a first position sensor mounted on a shaft of a motor, and a second position sensor mounted at an output end of a harmonic speed reducer.

One input end of the first difference comparator inputs a target angle, and the other input end of the first difference comparator is connected to an output end of the second position sensor, and used to input a load angle. An output end of the first difference comparator is connected to an input end of the position controller.

One input end of the second difference comparator is connected to an output end of the position controller and used to input a load angular speed reference output by the position controller, and the other input end of the second difference comparator is connected to the output end of the second position sensor and used to input a load angular speed. An output end of the second difference comparator is connected to the input end of the speed controller.

One input end of the third difference comparator is connected to an output end of the speed controller and used to input a motor angle speed reference output by the speed controller, and the other input end of the third difference comparator is connected to a first position sensor and used to input a motor angle. An output end of the third difference comparator is connected to an input end of the motor position controller.

One input end of the fourth difference comparator is connected to an output end of the motor position controller and used to input a motor angular speed reference output by the motor position controller, and the other input end of the fourth difference comparator is connected to the first position sensor and used to input a motor angular speed. The output end of the motor position controller is connected to an input end of the motor speed controller.

One input end of the fifth difference comparator is connected to an output end of the motor speed controller and used to input a motor current reference output by the motor speed controller, and the other input end of the fifth difference comparator is connected to the motor and used to input motor current feedback. An output end of the fifth difference comparator is connected to the current controller of the motor and used to control the current of the motor.

Further, the system includes a tracking differentiator.

The tracking differentiator has an input end inputting the target angle, and an output end connected to one input end of the first difference comparator, and is used to input the target angle processed by the tracking differentiator to the first difference comparator.

Further, an nth input angle c[n] is obtained by performing interpolation calculation on the target angle through the following equation:

$$c[n] = y[0] + \frac{(n-N[0]) \times (n-N[2])}{(N[1]-N[0]) \times (N[1]-N[2])} \times (y[1]-y[0]) +$$

-continued $$\frac{(n-N[0])\times(n-N[1])}{(N[2]-N[0])\times(N[2]-N[1])}\times(y[2]-y[0])c[n]=$$

$$y[0]+\frac{(n-N[0])\times(n-N[2])}{(N[1]-N[0])\times(N[1]-N[2])}\times(y[1]-y[0])+$$

$$\frac{(n-N[0])\times(n-N[1])}{(N[2]-N[0])\times(N[2]-N[1])}\times(y[2]-y[0])$$

wherein, y[2] is a newly obtained target angle, y[0] is a target angle obtained from the previous two times of y[2], y[1] is a target angle obtained from the previous time of y[2], N[0] is the number of interpolations before y[0], and has a value being 0, N[1] is the number of interpolations between two points y[0] and y[1], N[2] is the number of interpolations between two points y[0] and y[2], wherein n=1, 2, . . . i, and i is the total number of input angles between y[1] and y[2] obtained after interpolation calculation.

Further, the target angle processed by the tracking differentiator is specifically obtained by the following steps:

obtaining the nth input angle c[n] by performing interpolation calculation on the target angle through the following equation:

$$c[n]=y[0]+\frac{(n-N[0])\times(n-N[2])}{(N[1]-N[0])\times(N[1]-N[2])}\times(y[1]-y[0])+$$

$$\frac{(n-N[0])\times(n-N[1])}{(N[2]-N[0])\times(N[2]-N[1])}\times(y[2]-y[0])c[n]=$$

$$y[0]+\frac{(n-N[0])\times(n-N[2])}{(N[1]-N[0])\times(N[1]-N[2])}\times(y[1]-y[0])+$$

$$\frac{(n-N[0])\times(n-N[1])}{(N[2]-N[0])\times(N[2]-N[1])}\times(y[2]-y[0])$$

wherein, y[2] is a newly obtained target angle, y[0] is a target angle obtained from the previous two times of y[2], y[1] is a target angle obtained from the previous time of y[2], N[0] is the number of interpolations before y[0], and has a value being 0, N[1] is the number of interpolations between two points y[0] and y[1], N[2] is the number of interpolations between two points y[0] and y[2], wherein n=1, 2, . . . i, and i is the total number of input angles between y[1] and y[2] obtained after interpolation calculation;

performing five-point prediction calculation on the newly calculated 5 input angles to obtain a pre-extrapolation angle A[n], and taking the pre-extrapolation angle as the load angle reference:

$$A[n]=((c[4]-c[1])-(c[5]-c[1])+\frac{(c[2]-c[1]))}{16}+$$

$$(2\times((c[5]-c[1])-(c[2]-c[1]))+((c[5]-c[1])-(c[3]-c[1])))/4+$$

$$((c[5]-c[1])-(c[5]-c[1]))+c[1]$$

wherein c[5] is the latest input angle of the 5 input angles calculated latest, c[4] is an input angle of the previous time of c[5], c[3] is an input angle of the previous time of c[4], c[2] is an input angle of the previous time of c[3], c[1] is an input angle of the previous time of c[2].

Further, the system further includes a motor encoder and a turntable encoder.

The motor encoder has an input end connected to the first position sensor, and an output end connected to the third difference comparator and the fourth difference comparator respectively, and is used to encode first position information output by the first position sensor and output the motor angle and the motor angular speed respectively.

The turntable encoder has an input end connected to the second position sensor and an output end connected to the first difference comparator and the second difference comparator respectively, and is used to encode second position information output by the second position sensor and output the load angle and the load angular speed respectively.

Compared with the prior art, the present disclosure has the following beneficial effects:

1. The dual-position loop control method of the turntable based on the harmonic speed reduction mechanism achieves high-precision speed stationarity control at the low speed and high-precision position control of the turntable based on the harmonic speed reduction mechanism by designing the dual-position loop feedback control in combination with the analysis of the kinetic equations. In addition, the present disclosure can effectively solve the hysteresis caused by the speed reduction mechanism of the turntable, and the influences on the speed stationarity at the low speed and the position tracking precision caused by fluctuations of excessive commutation torque.

2. The present disclosure employs position path planning and a Lagrange three-point pre-extrapolation subdivision calculation method so that a smooth input angle can be output by calculation of the target angle, and meanwhile, the tracking delay can be effectively reduced. The output trajectory of the rear end of the harmonic speed reduction mechanism can track the desired trajectory rapidly and stably. The turntable can achieve high-precision position tracking control while achieving speed stationarity at the low speed even if disturbed by external nonlinearity factors.

3. The dual-position loop control system of the turntable based on the harmonic reduction mechanism uses feedbacks from two positions with the help of the first position sensor mounted on the shaft of the motor and the second position sensor mounted on the output end of the harmonic speed reducer respectively, wherein the response is fast at the position of the shaft of the motor, and the second position sensor at the output end of the harmonic speed reducer can directly measure the position of the harmonic output end. Therefore, the influence of nonlinearity factors on the control system is reduced, and the control system has the advantages thereof 4. According to the present disclosure, the tacking differentiator is used to solve the contradiction between overshoot and rapidity of dynamic response. The present disclosure has the characteristics of simplicity and easiness in implementation, thereby facilitating engineering implementation and application.

Figure 1:
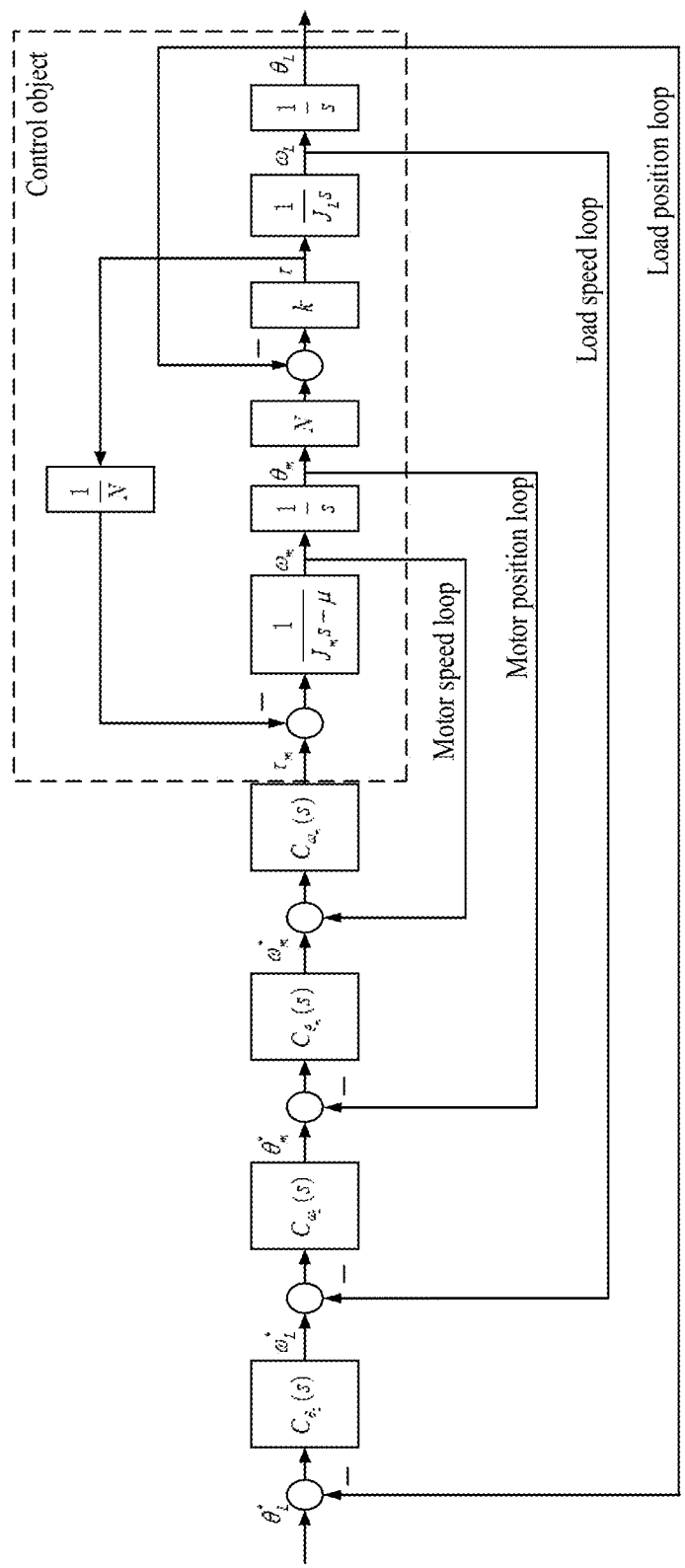
FIG. 1 is a schematic diagram of a dual-position loop control method of a turntable based on a harmonic reduction mechanism according to the present disclosure.

1—first difference comparator, 2—position controller, 3—second difference comparator, 4—speed controller, 5—third difference comparator, 6—motor position controller, 7—fourth difference comparator, 8—motor speed controller, 9—fifth difference comparator, 10—motor, 11—turntable, 12—current controller, 13—tracking differentiator, 14—motor encoder, 15—turntable encoder, 16—harmonic speed reducer, 17—dual-position loop control system of turntable based on harmonic speed reduction mechanism, 18—control unit, 19—DSP watchdog monitoring module, 20—multi-channel dual-power supply operational amplifier, 21—analog-to-digital converter, 22—azimuth-pitching motor driving module.

DETAILED DESCRIPTION OF THE EMBODIMENTS

In order to make the objectives, technical solutions and advantages of the embodiments of the present disclosure clearer, the technical solutions of the embodiments of the present disclosure will be clearly and completely described below in conjunction with the accompanying drawings of the embodiments of the present disclosure. Obviously, the described embodiments are some, but not all, of the embodiments of the present disclosure. The components of the embodiments of the present disclosure generally described and illustrated in the drawings herein can be arranged and designed in a variety of different configurations.

Due to the presence of nonlinearity factors caused by the flexibility of a harmonic speed reducer 16, there is no guarantee that high-precision position control can be accomplished and high-speed stationarity control can be achieved at the same time by either the semi-closed loop position control only by means of a position sensor on a shaft of a motor 10 or the full-closed loop position control by means of a position sensor at an output end of the harmonic speed reducer 16.

Based on this, the present disclosure first analyzes front and rear ends of the harmonic speed reducer 16, and a state space expression thereof is as shown in equation (1):

$$\dot{\theta}_L = \omega_L \quad (1)$$
$$J_L \dot{\omega}_L = \tau$$

-continued
$$\dot{\theta}_m = \omega_m$$
$$J_m \dot{\omega}_m + \frac{1}{N}\tau + \mu\omega_m = \tau_m$$
$$\tau = k\left(\frac{\theta_m}{N} - \theta_L\right)$$

wherein $\theta_L$ is a load angle, $\omega_L$ is a load angular speed, $J_L$ is a load rotating inertia, and $\theta_m$ is a motor angle, $\omega_m$ is a motor angular speed, $J_m$ is a motor rotor rotating inertia, $\tau$ is a load torque, $\tau_m$ is a motor torque, $\mu$ is a motor damping coefficient, k is rigidity of the harmonic speed reducer, and N is a reduction ratio of the harmonic speed reducer. $\dot{\theta}_L$ indicates derivative calculation on $\theta_L$, $\dot{\omega}_L$ indicates derivative calculation on $\omega_L$, $\dot{\theta}_m$ indicates derivative calculation on $\theta_m$, and $\dot{\omega}_m$ indicates derivative calculation on $\omega_m$.

Equation (2) and equation (3) are obtained through Laplace transform:

$$G_L(s) = \frac{\theta_L}{\tau} = \frac{N\omega_a^2}{(J_m s + \mu)s(s^2 + \omega_n^2)} \quad (2)$$

$$G_m(s) = \frac{\theta_m}{\tau} = \frac{s^2 + \omega_a^2}{(J_m s + \mu)s(s^2 + \omega_n^2)} \quad (3)$$

wherein $G_L(s)$ is a transfer function of a rear end of the harmonic speed reducer; $\omega_a$ is a system anti-resonance frequency; s is a complex number, indicating that $G_L(s)$ and $G_m(s)$ are expressions subjected to Laplace transform; $\omega_n$ is a system resonance frequency; and $G_m(s)$ is a transfer function at a motor end, $$\omega_n = \sqrt{k\left(\frac{1}{J_L} + \frac{N^2}{J_m}\right)} \quad (4)$$

$$\omega_a = \sqrt{\frac{k}{J_L}}. \quad (5)$$

Therefore, the speed stationarity control and high-precision position control are achieved in a manner of analyzing and designing dual-position loop control by comprehensively considering the advantages and disadvantages of the semi-closed loop position control and the full-closed loop position control in combination with the kinetic equations, wherein the control principle is as shown in FIG. 1. In FIG. 1, $\theta_L^*$ and $\omega_L^*$ are a load angle reference and a load angular speed reference respectively. $C_{74_L}(S)$, $C_{\omega_L}(S)$, $C_{\theta_m}(S)$ and $C_{\omega_m}(S)$ are a load position loop controller, a load speed loop controller, a motor position loop controller, and a motor speed loop controller respectively. Control objects in FIG. 1 include the motor 10 and the harmonic speed reducer 16. The boxes within the dashed box in FIG. 1 represent transfer functions respectively, which are a transfer function $$\frac{1}{J_m S + \mu},$$

a transfer function $$\frac{1}{S},$$

a transfer function N, a transfer function k, a transfer function $$\frac{1}{J_L S},$$

a transfer function $$\frac{1}{S},$$

and a transfer function $$\frac{1}{N}.$$

For the load position loop, $\theta_L$ serves as a closed loop feedback of the load position loop on the one hand, and serves as a reference factor for the load torque calculation formula on the other hand, i.e., $$\tau = k\left(\frac{\theta_m}{N} - \theta_L\right).$$

For the load speed loop, difference comparison is performed on the load angular speed $\omega_L$ and a load angular speed reference $\omega_L^*$, $C_{\omega_L}(S)$ is controlled to output the motor angle reference $\theta_m^*$ according to the difference comparison result. For the motor position loop, difference comparison is performed on the motor angle $\theta_m$ and the motor angle reference $\theta_m^*$, and $C_{\theta_m}(S)$ is controlled to output the motor angular speed reference $\omega_m^*$ according to the difference comparison result. For the motor speed loop, difference comparison is performed on the motor angular speed $\omega_m$ and the motor angular speed reference $\omega_m^*$, and $C_{\omega_m}(S)$ is controlled to output the motor torque $\tau_m$ according to the difference comparison result.

Based on the above principle, the present disclosure provides a dual-position loop control method of a turntable based on a harmonic reduction mechanism. A first position sensor needs to be installed a shaft of a motor 10, and a second position sensor needs to be installed on an output end of a harmonic speed reducer 16. The method specifically includes the following steps.

S1, first position information and second position information are collected

First position information output by the first position sensor mounted on the shaft of the motor 10, and second position information output by the second position sensor mounted on the output end of the harmonic speed reducer 16 are collected. Dual-position loop control uses information feedbacks from two positions, wherein corresponding two position sensors are mounted on the shaft of the motor 10 and the output end of the harmonic speed reducer 16, respectively. The response is quick at the position of the shaft of the motor 10, and the position sensor on the output end of the harmonic speed reducer 16 directly measures the position of the output end of the harmonic speed reducer 16, such that the system is less affected by nonlinearity factors.

S2, an angular speed, an angle and current are extracted.

A motor angular speed and a motor angle are extracted respectively from the first position information, and a load angle and a load angular speed are extracted respectively from the second position information; and meanwhile, motor current is acquired.

S3, closed loop control is performed.

S3.1, a difference comparison is performed on the load angle and a load angle reference, and a load angular speed reference is obtained according to the comparison result.

In addition, an active disturbance rejection strategy is introduced for the higher requirements placed on the low speed fluctuations of the turntable. A target angle is calculated by a larange three-point pre-extrapolation subdivision calculation method, and an nth input angle c[n] obtained by interpolation calculation is output, which is calculated as follows:

$$c[n] = y[0] + \frac{(n - N[0]) \times (n - N[2])}{(N[1] - N[0]) \times (N[1] - N[2])} \times (y[1] - y[0]) + \frac{(n - N[0]) \times (n - N[1])}{(N[2] - N[0]) \times (N[2] - N[1])} \times (y[2] - y[0]) \quad (6)$$

Wherein y[2] is a newly obtained target angle, y[0] is a target angle obtained from the previous two times of y[2], y[1] is a target angle obtained from the previous time of y[2], N[0] is the number of interpolations before y[0], and has a value being 0, N[1] is the number of interpolations between two points y[0] and y[1], N[2] is the number of interpolations between two points y[0] and y[2], wherein n=1, 2, . . . i, and i is the total number of input angles between y[1] and y[2] obtained after interpolation calculation. The time interval between every two times depends on the input frequency of the target angle, and the number of interpolations depends on the input frequency of a target angle to be interpolated and the control frequency of the input angle of the position loop after interpolation.

The target angle, which is an external input to the turntable, corresponds to an external control command. The target angle can be smoothly subdivided by interpolation calculation. In addition, as an optimal solution, a five-point prediction calculation method may be used, so that a pre-extrapolation angle A[n] is predicted by means of the newly calculated five points c[n] through five-point prediction calculation. The pre-extrapolation angle A[n] serves as the load angle reference, thereby effectively reducing the tracking delay.

$$A[n] = ((c[4] - c[1]) - (c[5] - c[1]) + \frac{(c[2] - c[1]))}{16} + (2 \times ((c[5] - c[1]) - (c[2] - c[1])) + ((c[5] - c[1]) - (c[3] - c[1])))/4 + ((c[5] - c[1]) - (c[5] - c[1])) + c[1]$$

wherein c[5] is the latest input angle of the 5 input angles calculated latest, c[4] is an input angle of the previous time of c[5], c[3] is an input angle of the previous time of c[4], c[2] is an input angle of the previous time of c[3], and c[1] is an input angle of the previous time of c[2]

S3.2, difference comparison is performed on the load angular speed and a load angular speed reference to obtain a motor angle reference according to the comparison result.

S3.3, difference comparison is performed on the motor angle and a motor angle reference to obtain a motor angular speed reference according to the comparison result.

S3.4, difference comparison is performed on the motor angular speed and a motor angular speed reference to obtain a motor current reference according to the comparison result;

S3.5, difference comparison is performed on the motor current and a motor current reference, and input current of the motor 10 is controlled according to the comparison result, thereby controlling the turntable 11 to operate.

Figure 2:
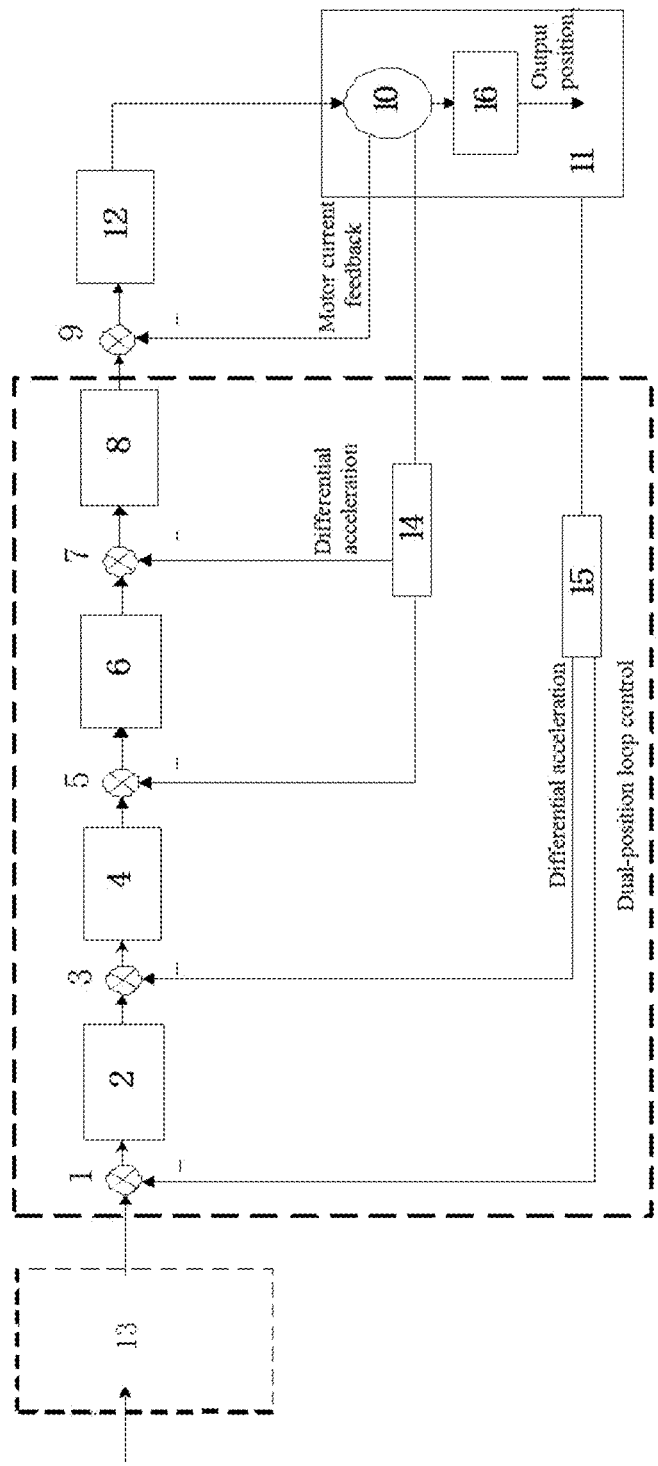
FIG. 2 is a schematic diagram of an embodiment of a dual-position loop control system of a turntable based on a harmonic reduction mechanism according to the present disclosure.

As shown in FIG. 2, in order to implement the above control method, the present disclosure further provides a dual-position loop control system of a turntable based on a harmonic speed reduction mechanism, including a motor encoder 14 and a turntable encoder 15, as well as a first difference comparator 1, a position controller 2, a second difference comparator 3, a speed controller 4, a third difference comparator 5, a motor position controller 6, a fourth difference comparator 7, a motor speed controller 8, and a fifth difference comparator 9 connected in sequence, and a first position sensor mounted on a shaft of a motor 10 and a second position sensor mounted an output end of a harmonic speed reducer 16. One input end of the first difference comparator 1 inputs a target angle, and the other input end of the first difference comparator 1 is connected to an output end of the second position sensor, and used to input a load angle. One input end of the second difference comparator 3 is connected to an output end of the position controller 2 and used to input a load angular speed reference output by the position controller 2, and the other input end of the second difference comparator 3 is connected to the output end of the second position sensor and used to input a load angular speed. Specifically, the turntable encoder 15 has an input end connected to the second position sensor and an output end connected to the first difference comparator 1 and the second difference comparator 3 respectively, and is used to encode second position information output by the second position sensor and output the load angle and the load angular speed respectively. One input end of the third difference comparator 5 is connected to an output end of the speed controller 4 and used to input a motor angle reference output by the speed controller 4, and the other input end of the third difference comparator 5 is connected to the first position sensor and used to input a motor angle. One input end of the fourth difference comparator 7 is connected to an output end of the motor position controller 6 and used to input a motor angular speed reference output by the motor position controller 6, and the other input end of the fourth difference comparator 7 is connected to the first position sensor and used to input a motor angular speed. Specifically, the motor encoder 14 has an input end connected to the first position sensor, and an output end connected to the third difference comparator 5 and the fourth difference comparator 7 respectively, and is used to encode first position information output by the first position sensor and output the motor angle and the motor angular speed respectively. One input end of the fifth difference comparator 9 is connected to an output end of the motor speed controller 8 and used to input a motor current reference output by the motor speed controller 8, and the other input end of the fifth difference comparator 9 is connected to the motor 10 and used to input motor current feedback; and an output end of the fifth difference comparator 9 is connected to the current controller 12 of the motor 10 and used to control the current of the motor 10.

Preferably, the control system further includes a tracking differentiator 13 that has an input end inputting the target angle, and an output end connected to one input end of the first difference comparator 1, and is used to input the target angle processed by the tracking differentiator 13 to the first difference comparator 1. The tracking differentiator 13 performs the Larange three-point pre-extrapolation subdivision calculation method, or the Larange three-point pre-extrapolation subdivision calculation method+the five-point prediction calculation method according to specific conditions. The Larange three-point pre-extrapolation subdivision calculation method allows the target angle to output a smooth input angle after processing of the tracking differentiator. The Larange three-point pre-extrapolation subdivision calculation method solves the contradiction between rapidity and overshoot existing in control and ensures the stability of the system. The five-point prediction calculation method can be further used in control while the target angle is smoothly subdivided by the Larange three-point pre-extrapolation subdivision calculation method. A newly target point can be predicted by means of the newly calculated five points c[n] through the five-point prediction calculation formula. The method can further effectively reduce the tracking delay.

Figure 3:
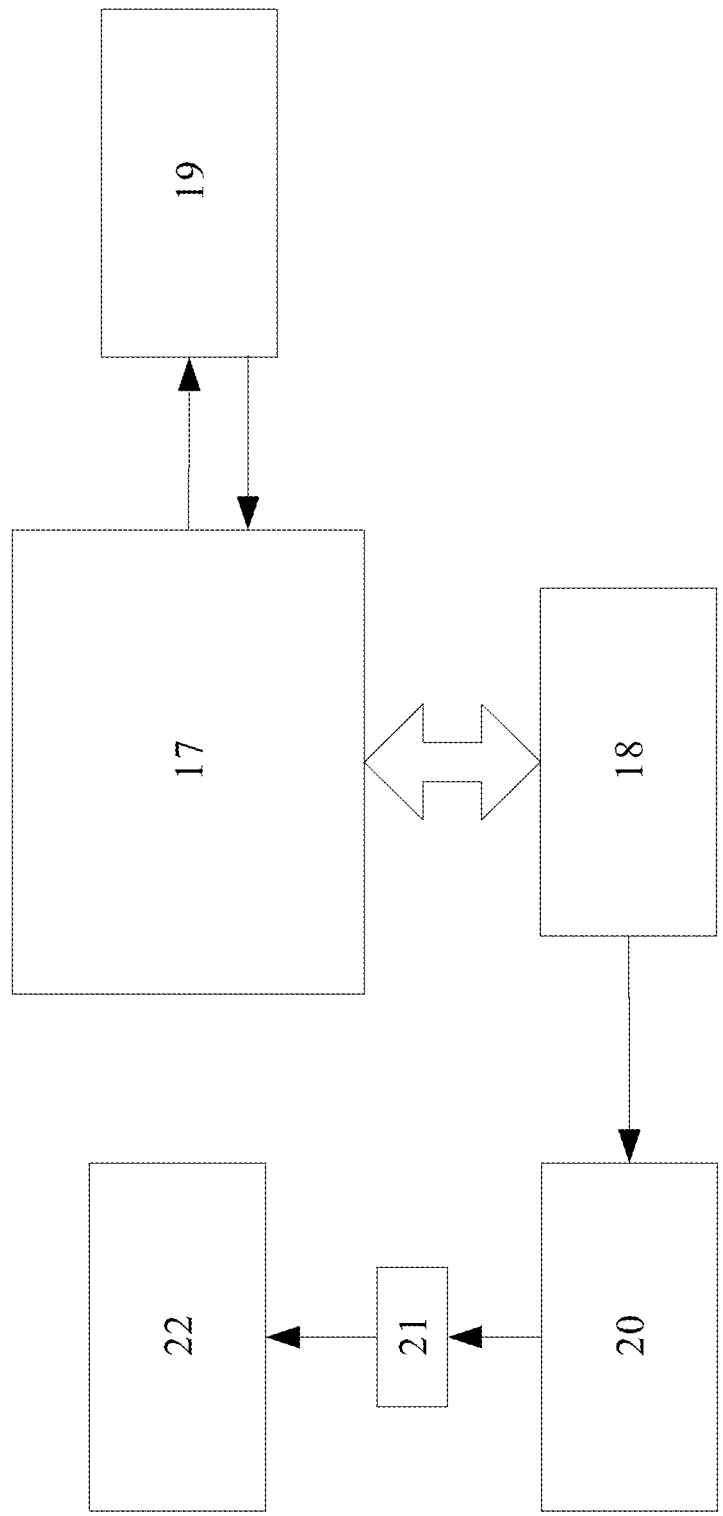
FIG. 3 is a schematic diagram of application of a dual-position loop control system of a turntable based on a harmonic reduction mechanism according to the present disclosure.

As shown in FIG. 3, when the dual-position loop control system of the turntable based on the harmonic speed reduction mechanism of the present disclosure is applied, a control unit 18 employs an interface management FPGA.

A dual-position loop control system 17 of a turntable based on a harmonic speed reduction mechanism is interconnected with the control unit 18 and a DSP watchdog monitoring module 19 respectively. The dual-position loop control system 17 of the turntable based on the harmonic speed reduction mechanism has a signal frequency of 100 Hz when inputting to the DSP watchdog monitoring module 19, and receives a pulse signal when receiving from the DSP watchdog monitoring module 19. RAM is shared between the dual-position loop control system 17 of the turntable based on the harmonic speed reduction mechanism and the control unit 18 which interact with each other through an I/O interface. The shared RAM is used for inputting turntable remote control instructions, star tracker data, gyro data and encoder data, and outputting motor control amount, turntable status, turntable angle value and turntable speed. An output end of the control unit 18 is sequentially connected to a multi-channel dual-power supply operational amplifier 20, an analog-to-digital converter 21 and an azimuth-pitching motor driving module 22. Output in 12 bits is performed between the control unit 18 and the multi-channel dual-power supply operational amplifier 20. The multi-channel dual-power supply operational amplifier 20 outputs a motor drive analog signal to the analog-to-digital converter 21 which outputs a motor drive voltage to the azimuth-pitching motor driving module 22.

Figure 4:
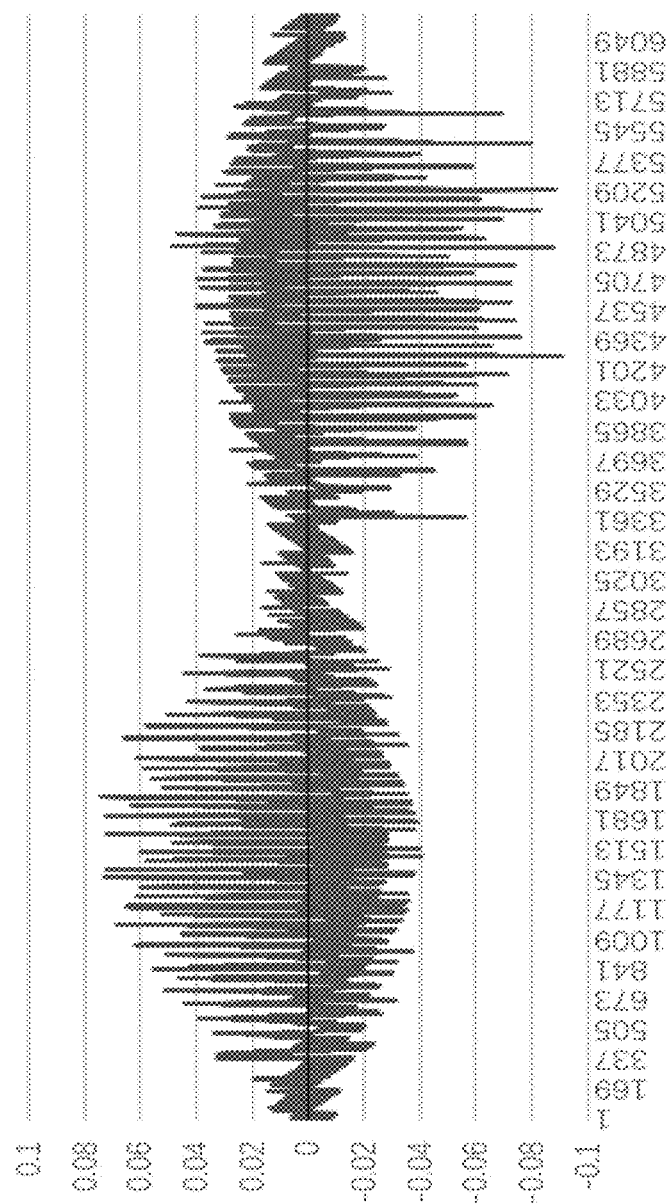
FIG. 4 is a graph of an azimuth speed error in an embodiment of a dual-position loop control system of a turntable based on a harmonic reduction mechanism according to the present disclosure.
Figure 5:
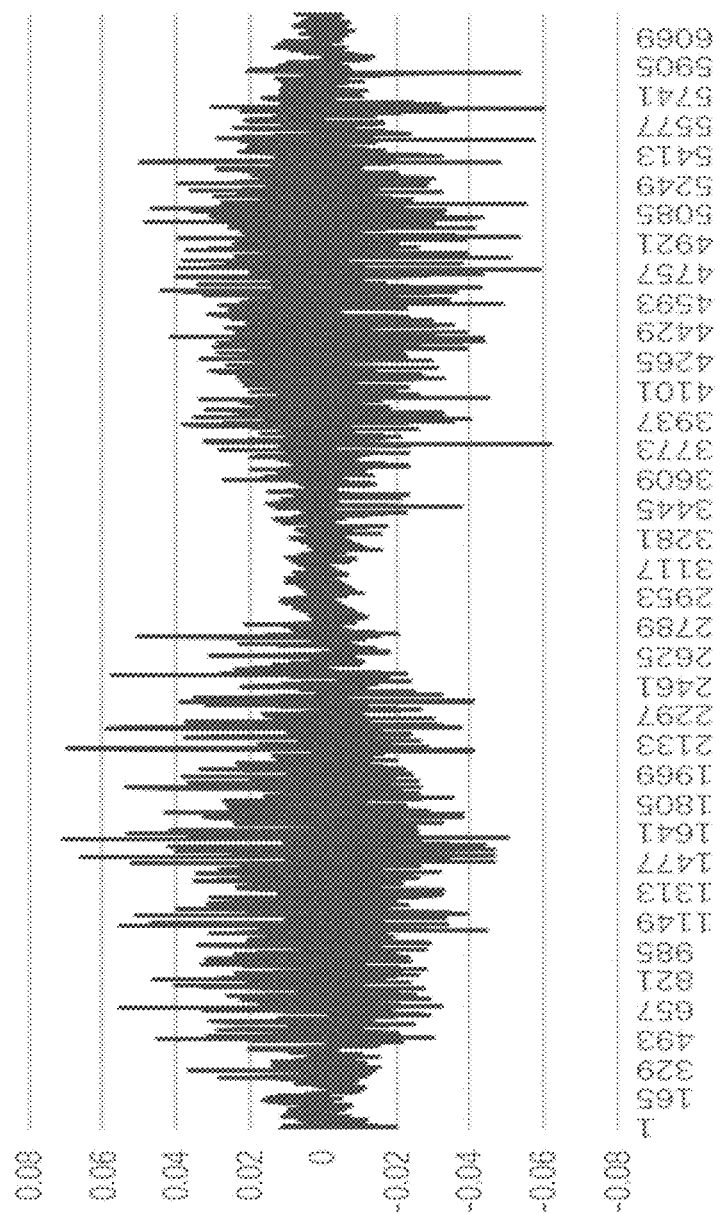
FIG. 5 is a graph of a pitching speed error in an embodiment of a dual-position loop control system of a turntable based on a harmonic reduction mechanism according to the present disclosure.

As shown in FIGS. 4 and 5, the dual-position loop control system 17 of the turntable based on the harmonic speed reduction mechanism is experimentally verified to obtain a maximum angular speed of the turntable 11 being 0.1°/s, an acceleration being $0.02°/s^2$, an azimuth speed error being 0.06°/s (3σ) and a pitching speed error being 0.039°/s (3σ).

Figure 6:
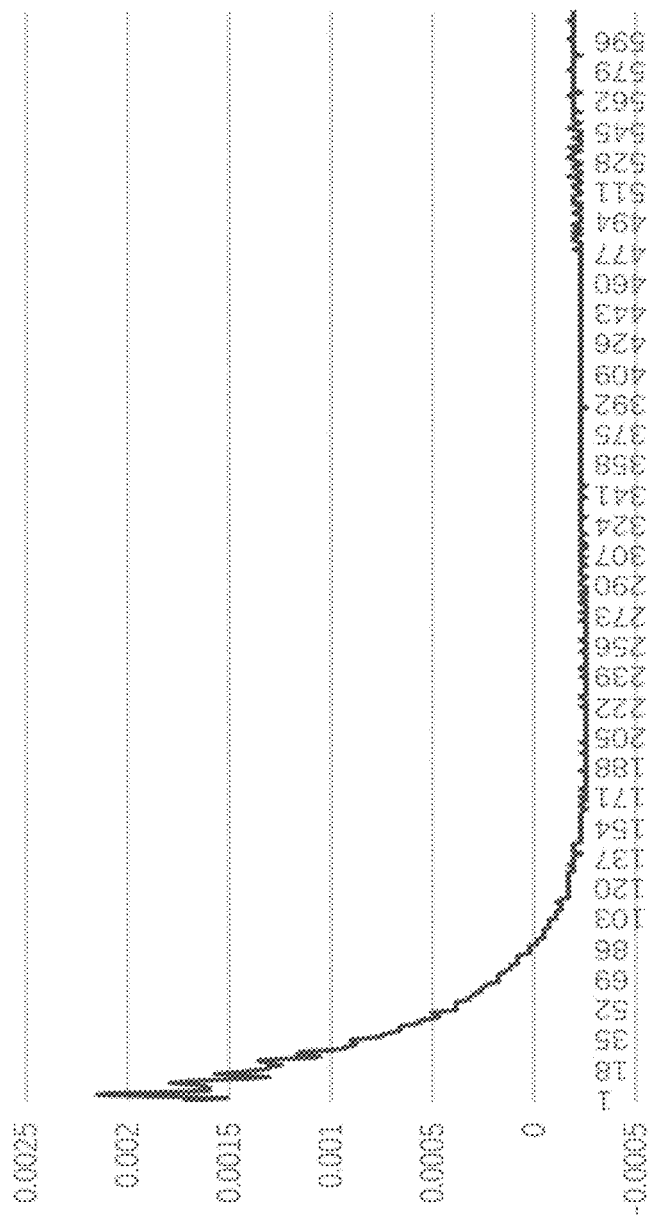
FIG. 6 is a graph of an angular error after azimuthal high speed maneuver in an embodiment of a dual-position loop control system of a turntable based on a harmonic reduction mechanism according to the present disclosure.
Figure 7:
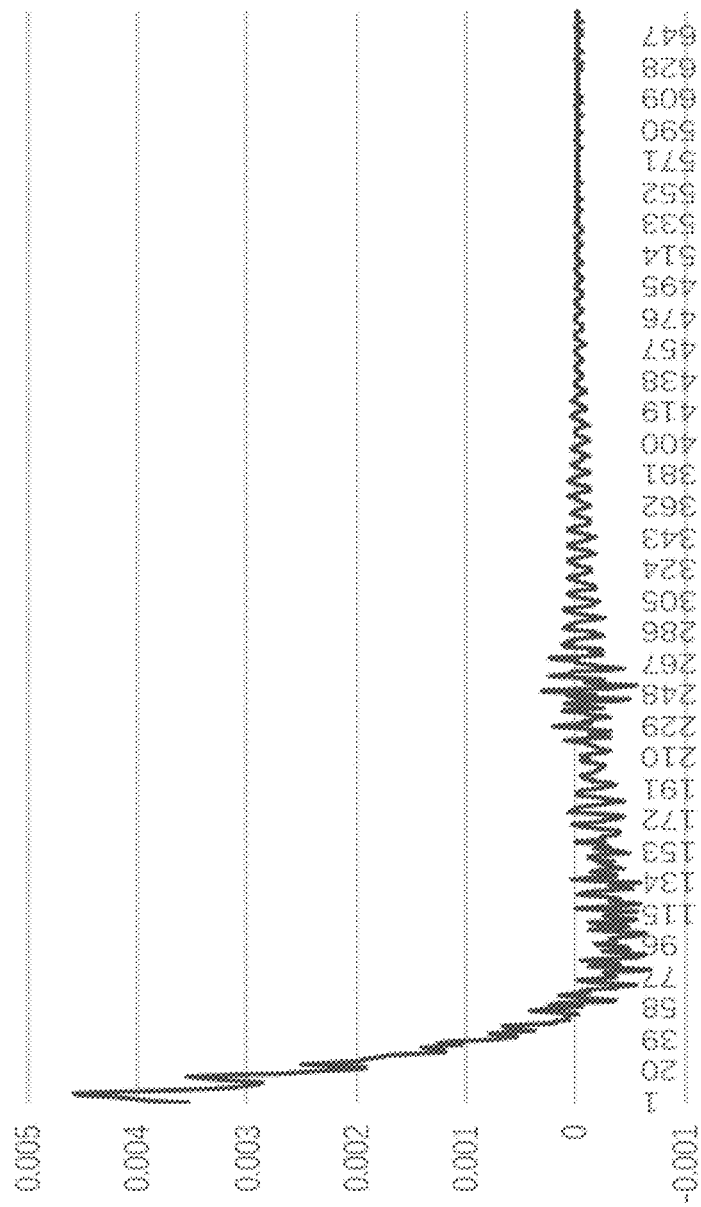
FIG. 7 is a graph of an angular error after pitching high speed maneuver in an embodiment of a dual-position loop control system of a turntable based on a harmonic reduction mechanism according to the present disclosure.

As shown in FIGS. 6 and 7, the turntable 11 is tested for a position error after high-speed maneuver to obtain an azimuth angle error after high-speed maneuver being 0.13' (3σ), and a pitching angle error after high-speed maneuver being 0.28' (3σ). In FIGS. 4-7, vertical coordinates are in units of °/s (degree/second), horizontal coordinates employ sample counts, with 500 samples per second.

The dual-position-loop control method and control system of the turntable based on the harmonic speed reduction mechanism of the present disclosure can effectively solve the hysteresis caused by the speed reduction mechanism of the turntable 11, and the influences on the speed stationarity at the low speed and the position tracking precision caused by fluctuations of excessive commutation torque. The tracking differentiator can effectively solve the contradiction between overshoot and rapidity of the dynamic response, and the output trajectory of the rear end of the harmonic speed reducer can track the desired trajectory rapidly and stably. The turntable 11 can achieve high-precision position tracking control while achieving speed stationarity at the low speed even if disturbed by external nonlinearity factors. In addition, the present disclosure has the characteristics of simplicity and easiness in implementation, thereby facilitating engineering implementation and application Compared to the patent applications in the Background, the present disclosure improves the disturbance rejection capability of the system to position disturbances in front of and behind a flexible joint by using the dual-position loop control method with a total of four closed loops, i.e., load position end feedback, load speed loop feedback, motor position loop feedback and motor speed loop feedback through derivation of kinetic equations. In addition, the patent applications in the Background employ a conventional tracking differentiator (TD) in the front phase for input of the position. However, the present disclosure innovatively introduces the Larange three-point interpolation method and the five-point pre-extrapolation calculation method into the tracking differentiator 13, making the position loop input signal smoother and reducing the input delay. Therefore, the present disclosure has a higher active disturbance rejection control precision than the solutions in the Background, especially in the control of low-speed stationarity of the flexible joint.

In practical application, the present disclosure can also be applied to single-axis turntables, not only to turntables based on harmonic reduction mechanisms, but also to control systems employing other reduction mechanisms, with appropriate replacement of the harmonic speed reducer and the second position sensor on the output end. In addition, the control system of the present disclosure, which is primarily applicable to spatial rotation mechanisms, can likewise be applied to spatial robotic arms or turntables on loading equipment of imaging systems and the like, for example, can be applied in the field of ground-based and space-based observation.

The above are merely the preferred embodiments of the present disclosure and are not intended to limit the present disclosure. For those skilled in the art, various modifications and variations can be made to the present disclosure. All modifications, equivalent replacements, improvements, and the like made within the spirit and scope of the present disclosure should fall within the scope of protection of the present disclosure.

The invention claimed is:

1. A dual-position loop control method of a turntable based on a harmonic speed reduction mechanism, comprising the following steps:

S1 of collecting first position information and second position information, which comprises:
collecting the first position information output by a first position sensor mounted on a shaft of a motor, and the second position information output by a second position sensor mounted on an output end of a harmonic speed reducer;

S2 of extracting an angular speed, an angle and current, which comprises:
extracting a motor angular speed and a motor angle from the first position information, extracting a load angle and a load angular speed from the second position information; and acquiring motor current; and S3 of implementing closed loop control, which comprises:

S3.1, performing difference comparison on the load angle and a load angle reference to obtain a load angular speed reference;

S3.2, performing difference comparison on the load angular speed and a load angular speed reference to obtain a motor angle reference;

S3.3, performing difference comparison on the motor angle and a motor angle reference to obtain a motor angular speed reference;

S3.4, performing difference comparison on the motor angular speed and a motor angular speed reference to obtain a motor current reference; and S3.5, performing difference comparison on the motor current and a motor current reference, and controlling input current of the motor, thereby controlling the turntable to operate, wherein in step S3.1, the load angle reference is specifically an nth input angle obtained by performing interpolation calculation on a target angle according to the following equation:

$$c[n] = y[0] + \frac{(n-N[0]) \times (n-N[2])}{(N[1]-N[0]) \times (N[1]-N[2])} \times (y[1]-y[0]) + \frac{(n-N[0]) \times (n-N[1])}{(N[2]-N[0]) \times (N[2]-N[1])} \times (y[2]-y[0]),$$

wherein, y[2] is a newly obtained target angle, y[0] is a target angle obtained from the previous two times of y[2], y[1] is a target angle obtained from the previous time of y[2], N[0] is the number of interpolations before y[0], and has a value being 0, N[1] is the number of interpolations between two points y[0] and y[1], N[2] is the number of interpolations between two points y[0] and y[2], wherein n=1, 2, . . . i, and i is the total number of input angles between y[1] and y[2] obtained after interpolation calculation.

2. The dual-position loop control method of the turntable based on the harmonic speed reduction mechanism of claim 1, wherein in step S3.1.2, performing five-point prediction calculation on the newly calculated 5 input angles to obtain a pre-extrapolation angle A[n], and taking the pre-extrapolation angle as the load angle reference according to: A[n]=((c[4]−c[1])−(c[5]−c[1])+(2×((c[5]−c[1])−(c[2]−c[1]))+((c[5]−c[1])−(c[3]−c[1])))/4+((c[5]−c[1])−(c[5]−c[1]))+c[1]1 wherein c[5] is the latest input angle of the 5 input angles calculated latest, c[4] is an input angle of the previous time of c[5], c[3] is an input angle of the previous time of c[4], c[2] is an input angle of the previous time of c[3], and c[1] is an input angle of the previous time of c[2].

3. A dual-position loop control system of a turntable based on a harmonic reduction mechanism, configured to implement the dual-position loop control method of the turntable based on the harmonic speed reduction mechanism of claim 1, and comprising a first difference comparator, a position controller, a second difference comparator, a speed controller, a third difference comparator, a motor position controller, a fourth difference comparator, a motor speed controller and a fifth difference comparator, as well as a current controller for connecting a motor, a first position sensor mounted on a shaft of the motor, and a second position sensor mounted at an output end of a harmonic speed reducer, wherein:
- a first input end of the first difference comparator is configured to input a target angle, and a second input end of the first difference comparator is connected to an output end of the second position sensor and configured to input a load angle; an output end of the first difference comparator is connected to an input end of the position controller;
- a first input end of the second difference comparator (3) is connected to an output end of the position controller and configured to input a load angular speed reference output by the position controller, and a second the other input end of the second difference comparator is connected to the output end of the second position sensor and configured to input a load angular speed;
- an output end of the second difference comparator is connected to the input end of the speed controller;
- a first input end of the third difference comparator is connected to an output end of the speed controller and configured to input a motor angle reference output by the speed controller, and a second input end of the third difference comparator is connected to a first position sensor and configured to input a motor angle; an output end of the third difference comparator is connected to an input end of the motor position controller;
- a first input end of the fourth difference comparator is connected to an output end of the motor position controller and configured to input a motor angular speed reference output by the motor position controller, and a second input end of the fourth difference comparator is connected to the first position sensor and configured to input a motor angular speed;
- the output end of the motor position controller is connected to an input end of the motor speed controller;
- a first input end of the fifth difference comparator is connected to an output end of the motor speed controller and configured to input a motor current reference output by the motor speed controller, and a second input end of the fifth difference comparator is connected to the motor and configured to input motor current feedback; and
- an output end of the fifth difference comparator is connected to the current controller of the motor and configured to control the current of the motor.

4. The dual-position loop control system of the turntable based on the harmonic reduction mechanism of claim 3, further comprising a tracking differentiator, wherein
the tracking differentiator has an input end configured to receive the target angle, and an output end connected to the first input end of the first difference comparator (1), and is configured to input the target angle processed by the tracking differentiator to the first difference comparator.

5. The dual-position loop control system of the turntable based on the harmonic reduction mechanism of claim 4, performing five-point prediction calculation on the newly calculated 5 input angles to obtain a pre-extrapolation angle $A[n]$, and taking the pre-extrapolation angle as the load angle reference according to: $A[n]=((c[4]-c[1])-(c[5]-c[1])++(2\times((c[5]-c[1])-(c[2]-c[1]))+((c[5]-c[1])-(c[3]-c[1])))/4+((c[5]-c[1])-(c[5]-c[1]))+c[1]1$ wherein $c[5]$ is the latest input angle of the 5 input angles calculated latest, $c[4]$ is an input angle of the previous time of $c[5]$, $c[3]$ is an input angle of the previous time of $c[4]$, $c[2]$ is an input angle of the previous time of $c[3]$, $c[1]$ is an input angle of the previous time of $c[2]$.

6. The dual-position loop control system of the turntable based on the harmonic reduction mechanism of claim 3, further comprising a motor encoder and a turntable encoder, wherein:
the motor encoder has an input end connected to the first position sensor, and an output end connected to the third difference comparator and the fourth difference comparator (7), and is configured to encode first position information output by the first position sensor and output the motor angle and the motor angular speed, and
the turntable encoder has an input end connected to the second position sensor and an output end connected to the first difference comparator and the second difference comparator, and is configured to encode second position information output by the second position sensor and output the load angle and the load angular speed.

* * * * *